(12) United States Patent
Mohammadi et al.

(10) Patent No.: US 8,914,686 B2
(45) Date of Patent: Dec. 16, 2014

(54) THROUGHPUT IMPROVEMENT IN WIRELESS SYSTEMS

(75) Inventors: Arezou Mohammadi, Ottawa (CA); Edward Mah, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 542 days.

(21) Appl. No.: 13/208,392

(22) Filed: Aug. 12, 2011

(65) Prior Publication Data

US 2013/0042157 A1 Feb. 14, 2013

(51) Int. Cl.
*G06F 11/00* (2006.01)
*H04L 1/18* (2006.01)
*H04L 1/00* (2006.01)

(52) U.S. Cl.
CPC ............ *H04L 1/0026* (2013.01); *H04L 1/1812* (2013.01)
USPC ....................................... 714/704

(58) Field of Classification Search
CPC ... H04L 1/0026; H04L 1/1812; H04L 1/0002; H04L 1/0003; H04L 1/0009; H04L 1/20; H04L 1/0017; H04L 1/1819; H04L 1/203; H04W 72/042; H04W 52/20; H04B 17/006
USPC .......... 714/704, 748, 712, 752, 751; 370/328, 370/252; 455/226.3, 227.2
See application file for complete search history.

(56) References Cited

U.S. PATENT DOCUMENTS

| | | | |
|---|---|---|---|
| 6,930,981 B2 * | 8/2005 | Gopalakrishnan et al. | 370/252 |
| 7,350,125 B2 * | 3/2008 | Jang et al. | 714/748 |
| 7,548,760 B2 * | 6/2009 | Vasudevan et al. | 455/522 |
| 7,620,872 B2 * | 11/2009 | Kwon et al. | 714/751 |
| 8,018,893 B2 * | 9/2011 | Sartori et al. | 370/329 |
| 8,054,740 B2 * | 11/2011 | Costa et al. | 370/208 |
| 8,214,709 B2 * | 7/2012 | Umesh et al. | 714/748 |
| 8,423,854 B2 * | 4/2013 | Dinan et al. | 714/748 |
| 8,516,325 B2 * | 8/2013 | Wan et al. | 714/748 |
| 8,532,012 B2 * | 9/2013 | Wang et al. | 370/312 |
| 8,555,125 B2 * | 10/2013 | Sahara | 714/748 |
| 2010/0329134 A1 * | 12/2010 | Doppler et al. | 370/252 |
| 2011/0026408 A1 | 2/2011 | Skarve et al. | |

FOREIGN PATENT DOCUMENTS

| | | |
|---|---|---|
| EP | 2086153 A2 | 8/2009 |
| GB | 2432751 A | 5/2007 |
| WO | 2010025270 A1 | 3/2010 |

OTHER PUBLICATIONS

International Search Report for International Patent Application No. PCT/IB2012/054098 mailed Dec. 12, 2012, 10 pages.
Colom, et al., "A novel link error prediction model for OFDM sytems with HARQ," 2011 IEEE International Conference on Communications: ICC2011, Kyoto, Japan, Jun. 5-9, 2011, 5 pages.

(Continued)

*Primary Examiner* — Phung M Chung
(74) *Attorney, Agent, or Firm* — Withrow & Terranova, PLLC

(57) ABSTRACT

Systems and methods are disclosed for improving throughput in a wireless system utilizing Hybrid Automatic Repeat Request (HARQ) retransmission. In general, prior to a HARQ-enabled transmission, one or more channel conditions for a corresponding transmit channel are obtained. Based on the one or more channel conditions, a set of target block error rates for the HARQ-enabled transmission are determined. In one embodiment, the set of target block error rates maximize throughput for the transmit channel utilizing HARQ retransmission. In another embodiment, the set of target block error rates optimize throughput and one or more additional parameters for the transmit channel utilizing HARQ retransmission.

35 Claims, 17 Drawing Sheets

(56) References Cited

OTHER PUBLICATIONS

Written Opinion for International Application No. PCT/IB2012/054098, mailed Sep. 16, 2013, 7 pages.

International Preliminary Report on Patentability for International Application No. PCT/IB2012/054098, mailed Nov. 14, 2013, 8 pages.

* cited by examiner

US 8,914,686 B2

THROUGHPUT IMPROVEMENT IN WIRELESS SYSTEMS

FIELD OF THE DISCLOSURE

The present disclosure relates to wireless systems and more particularly relates to improving throughput in wireless systems utilizing Hybrid Automatic Repeat Request (HARQ) retransmission.

BACKGROUND

Hybrid Automatic Repeat Request (HARQ) is commonly used in modern communications systems on top of the physic layer in order to mitigate errors that occur during transmission of data. For instance, the High Speed Downlink Packet Access for Wideband Code Division Multiple Access (WCDMA) and Long Term Evolution (LTE) networks use HARQ at the physical layer to mitigate errors that occur during transmission of data. In general, in HARQ systems, an incorrectly received data block (e.g., a packet) is retransmitted and all transmissions for the data block are jointly decoded. More specifically, in a HARQ system, a transmitter sends a transmission of data to a receiver. If the receiver is unable to successfully decode the transmission, the receiver sends a negative acknowledgement (NACK) to the transmitter over a reverse control channel. In response, the transmitter performs a HARQ retransmission. For type-I HARQ, which is sometimes referred to as Chase Combining (CC), the retransmission comprises the same bits sent in the initial transmission. For type-II HARQ, sometimes referred to as HARQ with incremental redundancy, new bits are added to the retransmission. This process is repeated until the receiver has successfully decoded the transmission or a maximum allowable number of retransmissions have been performed.

Traditionally, HARQ systems are configured such that most HARQ-enabled transmissions are successfully decoded by the receiver on the first transmission iteration without any retransmissions. The inventors have found that always targeting successful reception of HARQ-enabled transmissions on the first transmission iteration does not utilize the full capacity of the HARQ feature particularly under certain channel conditions. As such, the present disclosure relates to systems and methods that utilize HARQ retransmissions to improve throughput in wireless systems.

SUMMARY

Systems and methods are disclosed for improving throughput in a wireless system utilizing Hybrid Automatic Repeat Request (HARQ) retransmission. In general, prior to a HARQ-enabled transmission, one or more channel conditions for a corresponding transmit channel are obtained. The transmit channel may be either an uplink channel or a downlink channel. Based on the one or more channel conditions, a set of target block error rates for the HARQ-enabled transmission are determined. The set of target block error rates are then utilized for the HARQ-enabled transmission. In one embodiment, the set of target block error rates maximize throughput for the transmit channel utilizing HARQ retransmission. In another embodiment, the set of target block error rates optimize throughput and one or more additional parameters for the transmit channel utilizing HARQ retransmission. Further, in one embodiment, the set of target block error rates is static throughout the HARQ-enabled transmission. In another embodiment, the set of target block error rates is updated prior to each transmission iteration in the HARQ-enabled transmission to reflect changes in the one or more channel conditions for the transmit channel.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 14:
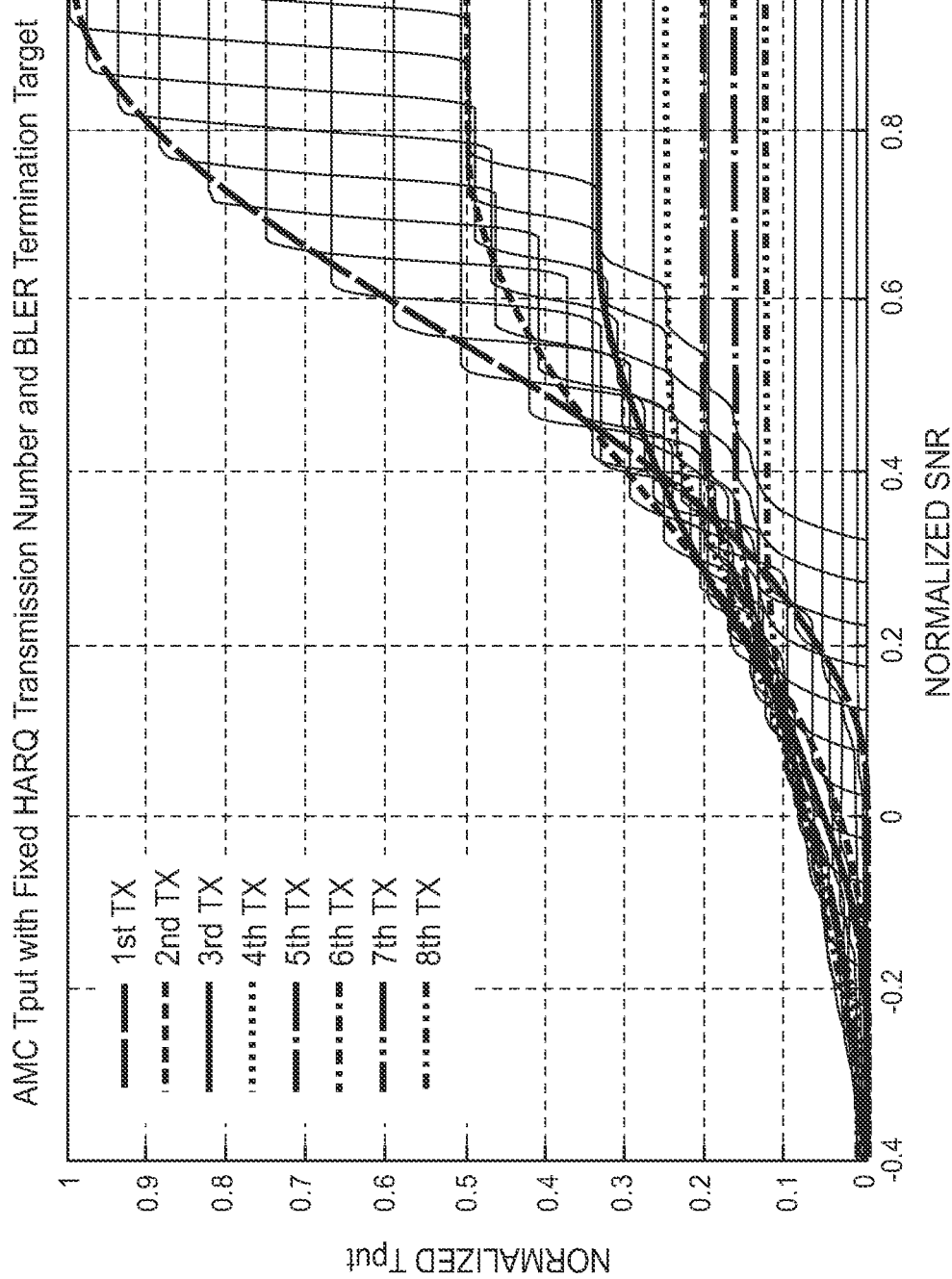
Figure 15:
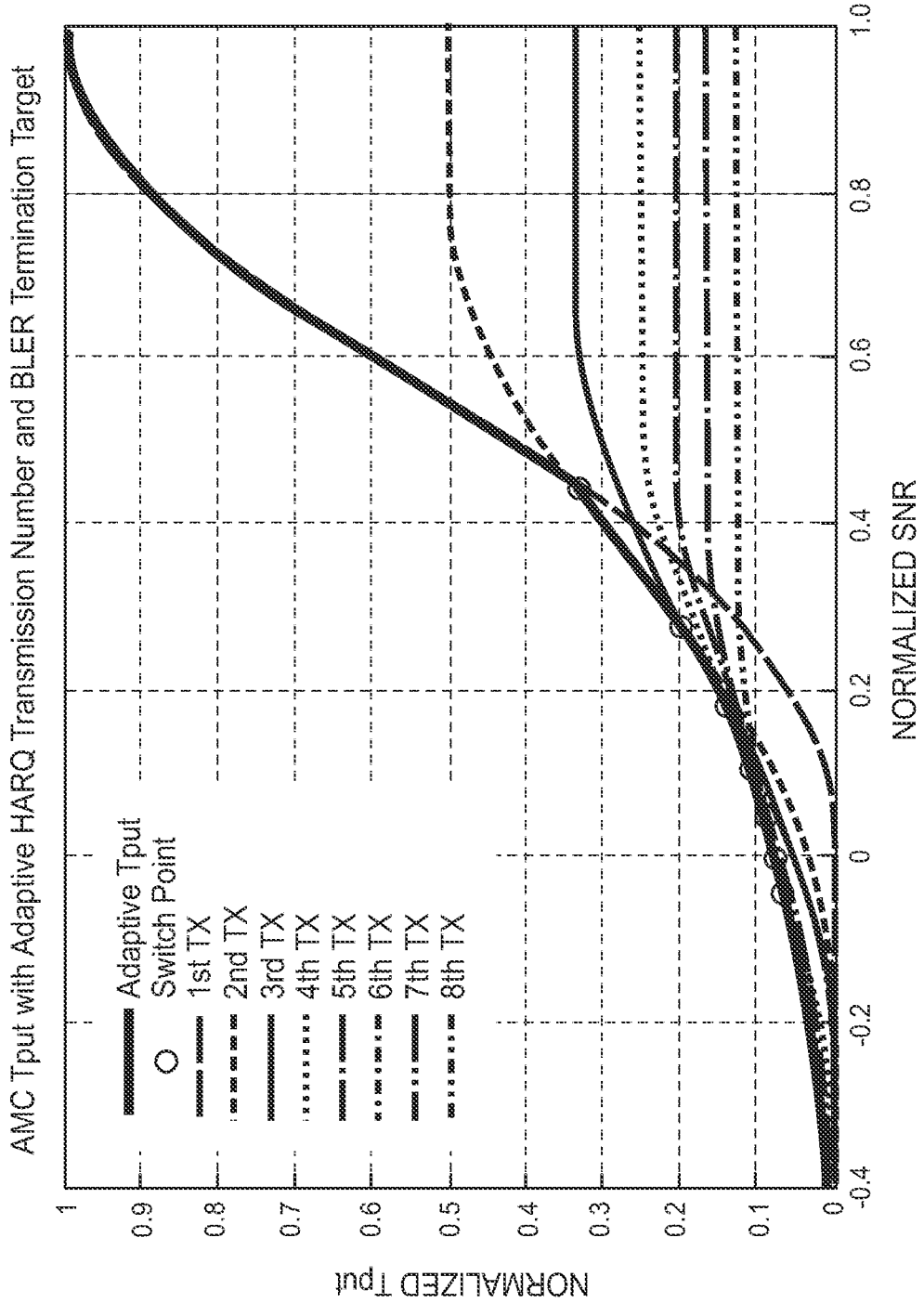

FIG. 14 is a graph that illustrates simulations for normalized throughput versus normalized SNR for link adaptation with an adaptive Modulation and Coding Scheme (MCS) for a number of target transmission iterations; and FIG. 15 is a graph similar to that of FIG. 14 that illustrates that throughput can be improved by targeting different transmission iterations for different SNR ranges according to one exemplary embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
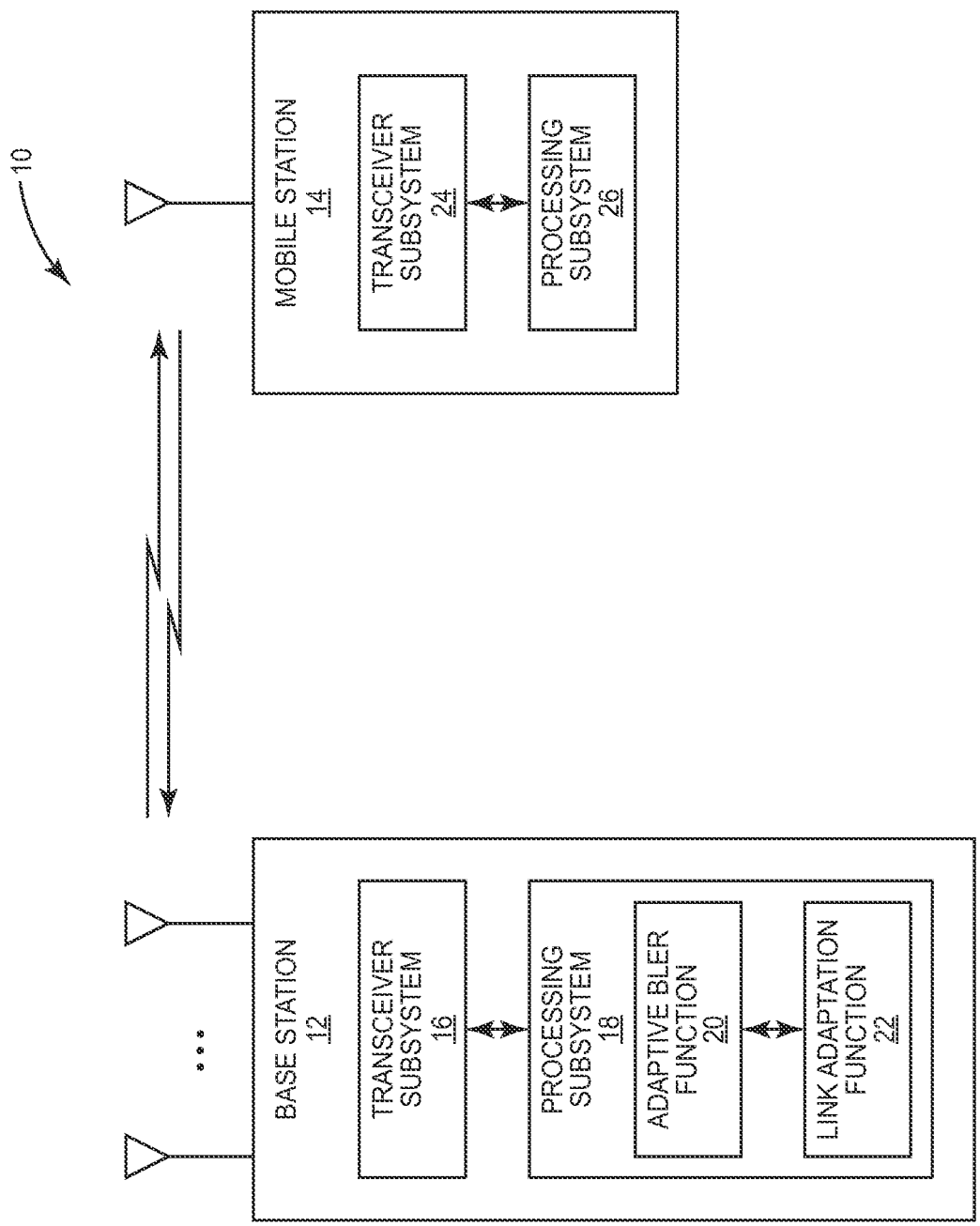
FIG. 1 illustrates a base station and a mobile station in a wireless communication system according to one embodiment of the present disclosure.

FIG. 1 illustrates a wireless system 10 according to one embodiment of the present disclosure. The wireless system 10 may be, for example, a Long Term Evolution (LTE) wireless system, a WiMAX wireless system, or a Code Division Multiple Access (CDMA) system. Note, however, that the wireless system 10 is not limited thereto and may generally be any wireless system having a Hybrid Automatic Repeat Request (HARQ) feature. The wireless system 10 includes a base station 12 and a mobile station 14. While FIG. 1 illustrates only one base station 12 and one mobile station 14, it will be readily appreciated that the wireless system 10 generally includes numerous base stations 12 each serving numerous mobile stations 14 located within corresponding service areas (e.g., cells) in the wireless system 10. The base station 12 may be, for example, a LTE evolved Node B (eNB), but is not limited thereto. In general, the base station 12 transmits signals to and receives signals from mobile stations, such as the mobile station 14, within a service area (e.g., a cell) of the base station 12.

The base station 12 includes a transceiver subsystem 16 and a processing subsystem 18. The transceiver subsystem 16 generally includes analog and, in some embodiments, digital components for sending and receiving data to and from the mobile station 14. From a wireless communications protocol view, the transceiver subsystem 16 implements at least part of Layer 1 (i.e., the Physical or "PHY" Layer). The processing subsystem 18 generally implements any remaining portion of Layer 1 as well as functions for higher layers in the wireless communications protocol for the wireless system 10 (e.g., Layer 2 (data link layer), Layer 3 (network layer), etc.). Of course, the detailed operation for each of the functional protocol layers, and thus the transceiver subsystem 16 and the processing subsystem 18, will vary depending on both the particular implementation as well as the standard or standards supported by the base station 12.

The processing subsystem 18 includes an adaptive block error rate (BLER) function 20 and a link adaptation function 22. As discussed below in detail, the adaptive BLER function 20 generally operates to control a target BLER provided to the link adaptation function 22 for HARQ-enabled transmissions. For a particular HARQ-enabled transmission, the adaptive BLER function 20 controls the target BLER for the HARQ-transmission such that throughput for a corresponding uplink or downlink transmit channel is improved by utilizing HARQ retransmission. In one embodiment, the link adaptation function 22 controls a Modulation and Coding Scheme (MCS) for each transmission iteration of the HARQ-enabled transmission directly or indirectly based on a corresponding target BLER provided by the adaptive BLER function 20.

More specifically, in conventional systems, the target block error rate utilized by the link adaptation function 22 is a low, static value (e.g., 10%) such that successful reception of HARQ-enabled transmissions is always targeted for a first transmission iteration for the HARQ-enabled transmission (i.e., target zero retransmissions) regardless of channel conditions. However, the inventors have found that doing so fails to utilize or exploit the full capacity of HARQ retransmission. In order to utilize the full capacity, or at least more of the full capacity, of HARQ retransmission, the adaptive BLER function 20 operates to control the target block error rate for a HARQ-enabled transmission to target successful reception on an N-th transmission iteration for the HARQ-enabled transmission (i.e., the N−1th retransmission) for one or more channel conditions of a corresponding transmit channel but using a higher, or more aggressive, MCS. By targeting the N-th transmission iteration and using a higher MCS, the throughput of the transmit channel is improved. In one embodiment, the adaptive BLER function 20 controls the target BLER such that throughput of the transmit channel is maximized for one or more channel conditions. In another embodiment, the adaptive BLER function 20 controls the target BLER such that throughput and one or more additional parameters are optimized for one or more channel conditions. The one or more additional parameters may be, for example, latency, Quality of Service (QoS), or the like.

Those skilled in the art will appreciate that the block diagram of the base station 12 in FIG. 1 necessarily omits numerous features that are not necessary to a complete understanding of this disclosure. For instance, although all of the details of the processing subsystem 18 are not illustrated, those skilled in the art will recognize that the processing subsystem 18 comprises one or several general-purpose or special-purpose microprocessors or other microcontrollers programmed with suitable software and/or firmware to carry out some or all of the functionality of the processing subsystem 18 described herein. In addition or alternatively, the processing subsystem 18 may comprise various digital hardware blocks (e.g., one or more Application Specific Integrated Circuits (ASICs), one or more off-the-shelf digital and analog hardware components, or a combination thereof) configured to carry out some or all of the functionality of the processing subsystem 18 described herein.

The mobile station 14 includes a transceiver subsystem 24 and a processing subsystem 26. The transceiver subsystem 24 generally includes analog and, in some embodiments, digital components for sending and receiving data to and from the base station 12. From a wireless communications protocol view, the transceiver subsystem 24 implements at least part of Layer 1 (i.e., the Physical or "PHY" Layer). The processing subsystem 26 generally implements any remaining portion of Layer 1 as well as functions for higher layers in the wireless communications protocol for the wireless system 10 (e.g., Layer 2 (data link layer), Layer 3 (network layer), etc.). Each of these functional layers may be implemented in the processing subsystem 26 by means of one or more microprocessors or microcontrollers executing program code, or by using one or more appropriately configured hardware blocks, or with some combination thereof. Of course, the detailed operation for each of the functional protocol layers, and thus the transceiver subsystem 24 and the processing subsystem 26, will vary depending on both the particular implementation as well as the standard or standards supported by the mobile station 14.

Figure 2:
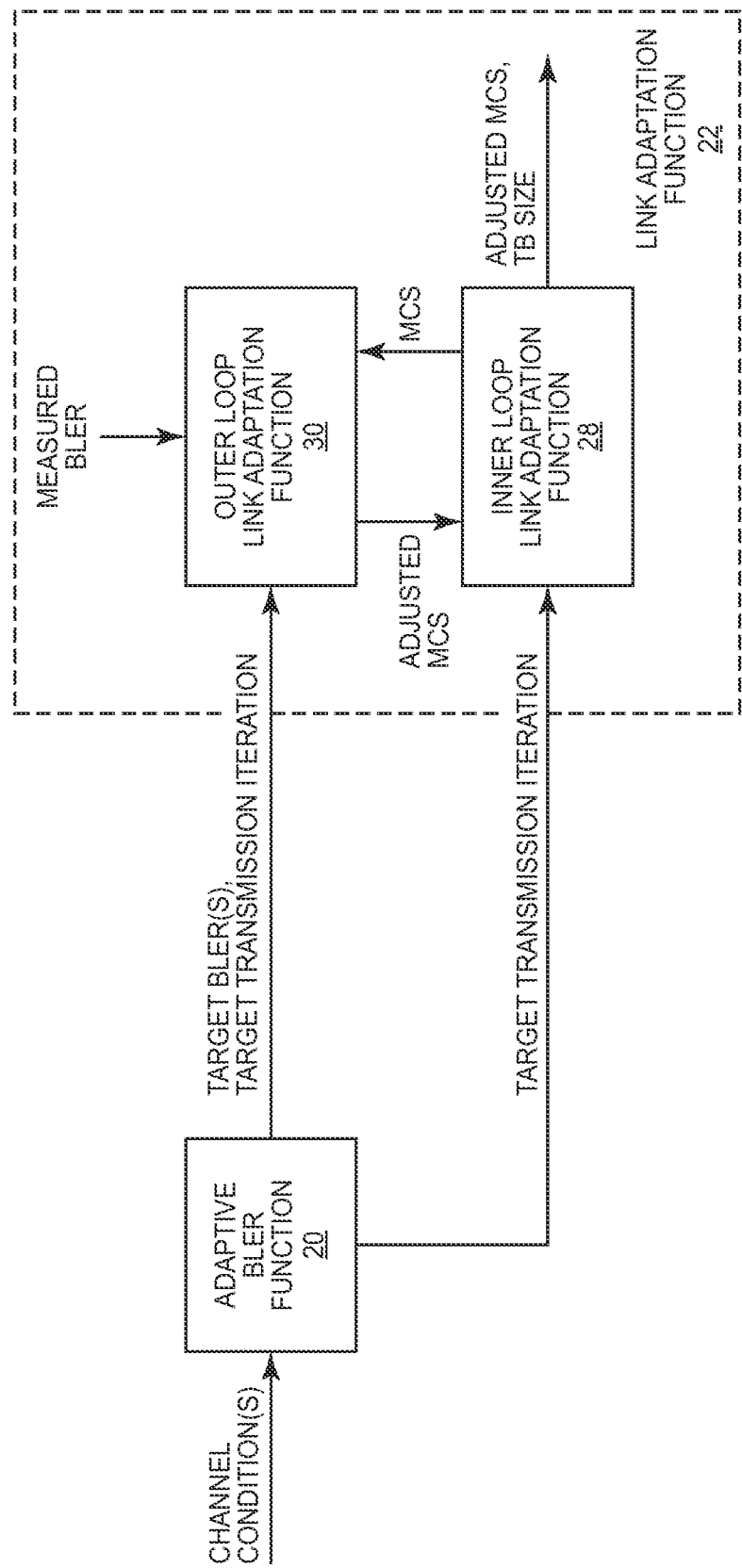
FIG. 2 is a block diagram that illustrates the operation of the adaptive block error rate (BLER) and link adaptation functions of FIG. 1 in more detail according to one embodiment of the present disclosure.

FIG. 2 is a block diagram illustrating the operation of the adaptive BLER function 20 and the link adaptation function 22 of FIG. 1 in more detail according to one embodiment of the present disclosure. The following description for the adaptive BLER function 20 and the link adaptation function 22 is for a single HARQ-enabled transmission, but it should be appreciated that this description is applicable to any number of HARQ-enabled transmissions. In operation, prior to a HARQ-enabled transmission (i.e., prior to a first transmission iteration for a HARQ-enabled transmission), the adaptive BLER function 20 obtains one or more channel conditions for a transmit channel for the HARQ-enabled transmission. The one or more channel conditions are generally any parameter that describes the transmit channel such as, for example, Signal-to-Noise Ratio (SNR), Signal-to-Interference-plus-Noise Ratio (SINR), velocity of the mobile station 14, Bit Error Rate (BER), Received Strength of Signal Indicator (RSSI), Channel Quality Indicator (CQI), or the like. The transmit channel may be a downlink transmit channel from the base station 12 to the mobile station 14 or an uplink transmit channel from the mobile station 14 to the base station 12. If the transmit channel is a downlink channel, the one or more channel conditions are measured by the mobile station 14 and returned to the base station 12. If the transmit channel is an uplink channel, the base station 12 measures the one or more channel conditions.

Based on the one or more channel conditions for the transmit channel, the adaptive BLER function 20 determines a set of target BLERs and, in some embodiments, a target transmission iteration for the HARQ-enabled transmission and provides the same to the link adaptation function 22. The target transmission iteration is the transmission iteration for the HARQ-enabled transmission that is targeted for successful decoding by the receiver. The adaptive BLER function 20 determines the set of target BLERs and, in some embodiments, the target transmission iteration that will provide improved throughput for the one or more channel conditions for the transmit channel. In one embodiment, the set of target BLERs and, in some embodiments, the target transmission iteration maximize throughput for the one or more channel conditions for the transmit channel. In another embodiment, the set of target BLERs and, in some embodiments, the target transmission iteration optimize throughput and one or more additional parameters for the one or more channel conditions for the transmit channel. The one or more additional parameters may include, for example, latency, QoS, or the like.

More specifically, the set of target BLERs target an N-th transmission iteration (i.e., the target transmission iteration) for successful decoding by the receiver. Particularly for poor or moderate channel conditions, N is greater than or equal to 2 such that an N−1th retransmission for the HARQ-enabled transmission is targeted for successful decoding by the receiver. As a result of targeting the N-th transmission iteration (i.e., the N−1th retransmission), a higher, or more aggressive, MCS(s) is(are) used for the transmission iterations for the HARQ-enabled transmission than would have otherwise been used if targeting the first transmission iteration (e.g., using a static 10% target BLER regardless of channel conditions). The target BLERs are selected such that the net effect of the more aggressive MCS(s) and HARQ retransmission iteration(s) is improved throughput.

Preferably, the set of target BLERs includes separate target BLERs for the transmission iterations for the HARQ-enabled transmission up to at least the target transmission iteration for successful decoding of the transmitted block of data by the receiver. For instance, if the target transmission iteration is the $3^{rd}$ transmission iteration (i.e., the $2^{nd}$ retransmission), then the set of target BLERs includes a first target BLER for the first transmission iteration, a second target BLER for the second transmission iteration, and a third target BLER for the third transmission iteration. The target BLER for the first transmission is greater than or equal to the target BLER for the second transmission iteration, the target BLER for the second transmission iteration is greater than or equal to the target BLER for the third transmission iteration, etc. For example, if the target transmission iteration is the third transmission iteration, the set of target BLERs may be 90%, 90%, 10%. The target transmission iteration is the N-th transmission iteration (i.e., the N−1th retransmission) for the HARQ-enabled transmission. At least under some channel conditions (e.g., channel conditions near the cell edge), N≥2. For instance, N may be greater than or equal to 2 for poor to moderate channel conditions (e.g., low to moderate SNR) and equal to 1 for good channel conditions (e.g., high SNR).

In one embodiment, the adaptive BLER function 20 is implemented as a Look Up Table (LUT) that is preconfigured with sets of target BLERs and, in some embodiments, target transmission iterations for a number of different channel conditions (e.g., two or more SNR ranges). The LUT may be configured based on simulations, actual measurements of throughput versus channel conditions for different target BLERs, or the like, or any combination thereof. Using the one or more channel conditions for the transmit channel as an input, the LUT outputs the corresponding set of target BLERs and, in some embodiments, target transmission iteration. In another embodiment, the adaptive BLER function 20 computes the set of target BLERs and, in some embodiments, the target transmission iteration based on the one or more channel conditions for the transmit channel using a predetermined algorithm.

In this embodiment, the link adaptation function 22 includes an inner loop link adaptation function 28 (hereinafter "inner loop 28") and an outer loop link adaptation function 30 (hereinafter "outer loop 30"). In operation, prior to the first transmission iteration for the HARQ-enabled transmission, the inner loop 28 determines or otherwise selects an MCS for the first transmission iteration using any suitable link adaptation algorithm. Notably, in some embodiments, the inner loop 28 may utilize the target transmission iteration as an input for the link adaptation algorithm. The inner loop 28 provides the selected MCS to the outer loop 30. Based on the target BLER for the first transmission iteration from the set of target BLERs and a measured BLER (e.g., a time-averaged actual BLER), the outer loop 30 adjusts the MCS for the first transmission iteration using any suitable outer loop link adaptation algorithm. In general, the outer loop 30 increases the MCS (i.e., changes the MCS to a more aggressive MCS) and returns the adjusted MCS to the inner loop 28. The inner loop 28 then outputs the adjusted MCS and, in some embodiments, other transport parameters (e.g., transport block size) to be used for the first transmission iteration.

Assuming that the first transmission iteration was not successful, in one embodiment, the link adaptation function 22 determines an MCS for the second transmission iteration (i.e., the first retransmission) for the HARQ-enabled transmission. The outer loop 30 then adjusts the MCS for the second transmission iteration based on the target BLER for the second transmission iteration from the set of target BLERs for the HARQ-enabled transmission and the measured BLER. Notably, in this embodiment, the set of target BLERs is determined only once prior to the first transmission iteration and is not updated during the HARQ-enabled transmission. The adjusted MCS for the second transmission iteration is returned to the inner loop 28 and then output for use for the second transmission iteration. This process is repeated for any additional transmission iterations until either the transmitted block of data has been successfully decoded by the receiver or until a preconfigured maximum allowable number of transmission iterations have been performed.

In another embodiment, assuming that the first transmission iteration was not successful, the adaptive BLER function 20 obtains one or more new channel conditions for the transmit channel (i.e., obtains updates for the one or more channel conditions) prior to the second transmission iteration. Based on the one or more new channel conditions, the adaptive BLER function 20 determines a new set of target BLERs and, in some embodiments, a new target transmission iteration for the HARQ-enabled transmission. The inner loop 28 determines an MCS for the second transmission iteration, and then the outer loop 30 adjusts the MCS for the second transmission iteration based on a target BLER for the second transmission iteration from the new set of target BLERs. The adjusted MCS is returned to the inner loop 28 and used for the second transmission iteration. This process is repeated for any additional transmission iterations until either the transmitted block of data has been successfully decoded by the receiver or until a preconfigured maximum allowable number of transmission iterations have been performed.

Before proceeding, it should be noted that while the discussion herein focuses on adjusting MCS based on the target BLER, the present disclosure is not limited thereto. In another embodiment, the set of target BLERs are utilized to indirectly adjust the MCS. For example, in one alternative embodiment, the set of target BLERs are utilized to adjust gain values for the corresponding transmission iterations, which in turn is directly or indirectly used to determine the MCS for the corresponding transmission iterations. In another alternative embodiment, the set of target BLERs are utilized to adjust a parameter relating to a value connoting signal strength and a value connoting channel condition for the corresponding transmission iterations, which in turn is directly or indirectly used to determine the MCSs for the corresponding transmission iterations.

Figure 3A:
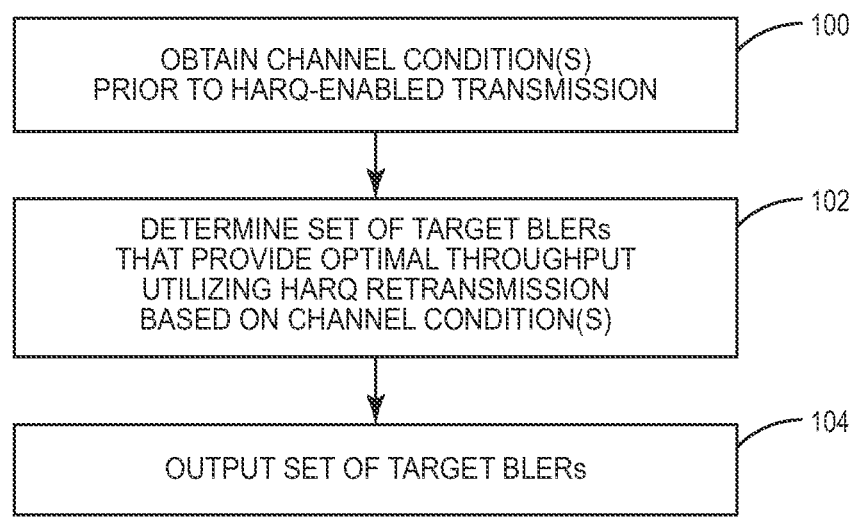
FIGS. 3A and 3B are flow charts that illustrate the operation of the adaptive BLER function and the outer loop link adaptation function, respectively, according to one embodiment of the present disclosure.
Figure 3B:
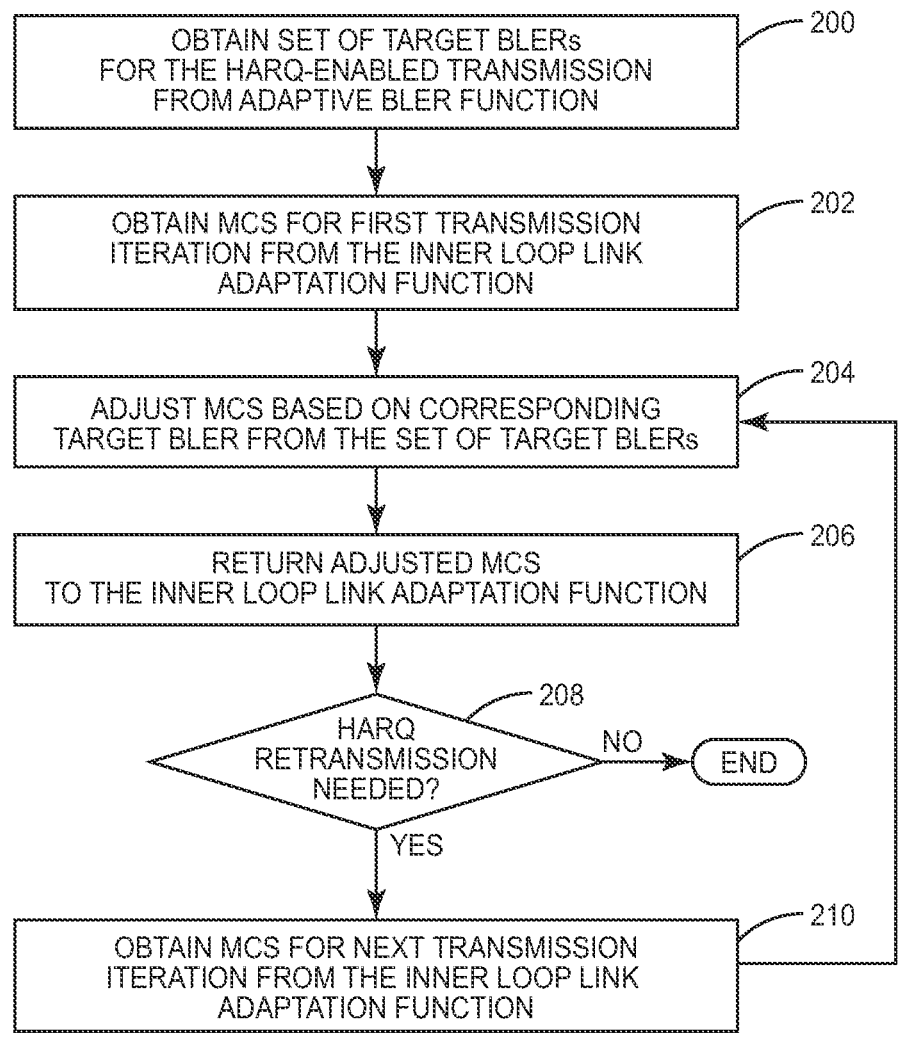

FIGS. 3A and 3B are flow charts illustrating the operation of the adaptive BLER function 20 and the outer loop 30, respectively, to provide improved throughput for a HARQ-enabled transmission according to one embodiment of the present disclosure. As illustrated in FIG. 3A, the adaptive BLER function 20 first obtains one or more channel conditions for a transmit channel for the HARQ-enabled transmission prior to the HARQ-enabled transmission (i.e., prior to a first transmission iteration for the HARQ-enabled transmission) (step 100). Next, the adaptive BLER function 20 determines a set of target BLERs that provides optimal throughput utilizing HARQ retransmission based on the one or more channel conditions (step 102). As discussed above, the optimal throughput may be maximum throughput or an optimization of throughput and one or more additional parameters. The adaptive BLER function 20 then outputs the set of target BLERs to the outer loop 30 (step 104). In addition, as discussed above, the adaptive BLER function 20 may output a target transmission iteration to the inner loop 28 and/or the outer loop 30. In this embodiment, the set of target BLERs and, if desired, the target transmission iteration for the HARQ-enabled transmission are determined only once for the HARQ-enabled transmission and are not updated during the HARQ-enabled transmission.

As illustrated in FIG. 3B, the outer loop 30 obtains the set of target BLERs from the adaptive BLER function 20 for the HARQ-enabled transmission (step 200). The outer loop 30 also obtains an MCS selected for the first transmission iteration from the inner loop 28 (step 202). The outer loop 30 adjusts the MCS for the transmission iteration, which at this point is the first transmission iteration, based on the corresponding target BLER from the set of target BLERs (step 204). The outer loop 30 then returns the adjusted MCS to the inner loop 28 (step 206). Next, a determination is made by the outer loop 30 as to whether a HARQ retransmission is needed (step 208). A HARQ retransmission is needed when a negative acknowledgement (NACK) or similar message is received from the receiver indicating that the receiver did not decode the transmitted block of data successfully. If no HARQ retransmission is needed, the process ends because the HARQ-enabled transmission has completed. However, if a HARQ retransmission is needed, the outer loop 30 obtains an MCS selected for the next transmission iteration from the inner loop 28 (step 210). The process then returns to step 204 and is repeated.

Figure 4:
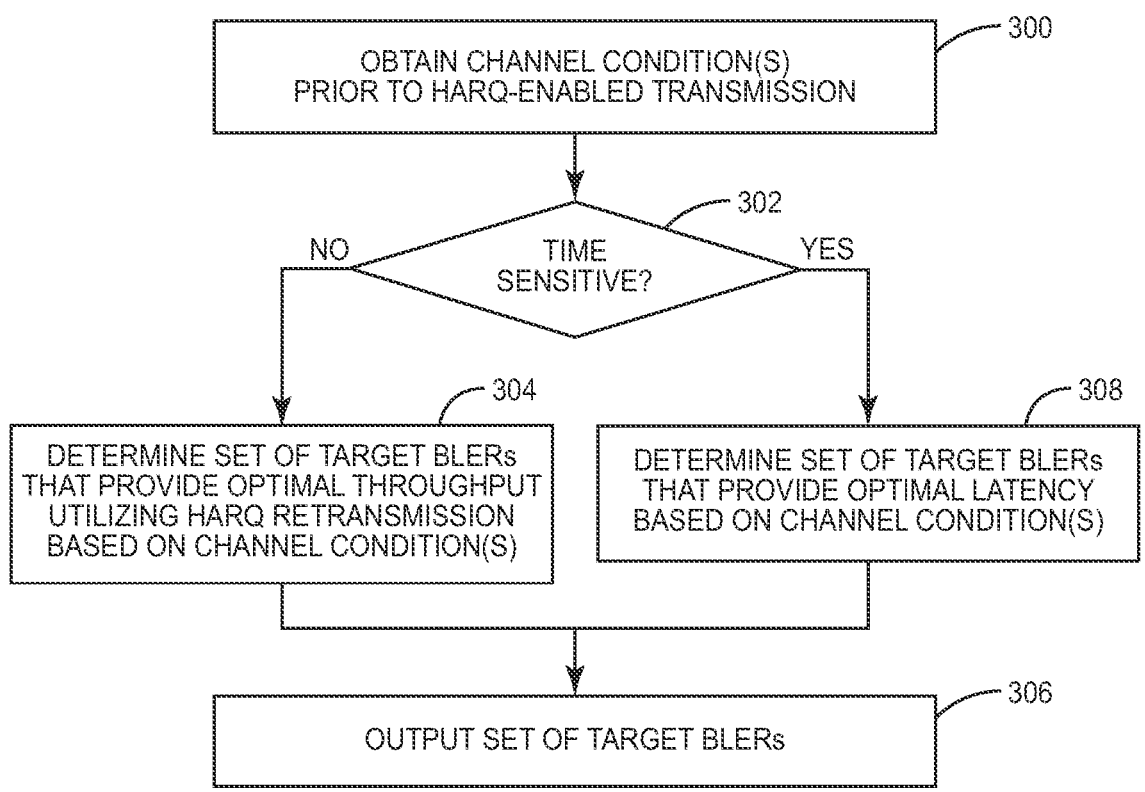
FIG. 4 is a flow chart that illustrates the operation of the adaptive BLER function according to another embodiment of the present disclosure.

FIG. 4 is a flow chart illustrating the operation of the adaptive BLER function 20 according to one alternative embodiment of the present disclosure. The adaptive BLER function 20 first obtains one or more channel conditions for a transmit channel for the HARQ-enabled transmission prior to the HARQ-enabled transmission (i.e., prior to a first transmission iteration for the HARQ-enabled transmission) (step 300). Next, the adaptive BLER function 20 determines whether the HARQ-enabled transmission is time sensitive (step 302). If the HARQ-enabled transmission is not time-sensitive, the adaptive BLER function 20 determines a set of target BLERs that provides optimal throughput utilizing HARQ retransmission based on the one or more channel conditions (step 304). As discussed above, the optimal throughput may be maximum throughput or an optimization of throughput and one or more additional parameters. The adaptive BLER function 20 then outputs the set of target BLERs to the outer loop 30 (step 306), where the set of target BLERs is utilized as discussed above with respect to FIG. 3B. In addition, as discussed above, the adaptive BLER function 20 may output a target transmission iteration to the inner loop 28 and/or the outer loop 30. In this embodiment, the set of target BLERs and, if desired, the target transmission iteration for the HARQ-enabled transmission are determined only once for the HARQ-enabled transmission and are not updated during the HARQ-enabled transmission.

Returning to step 302, if the HARQ-enabled transmission is time sensitive, the adaptive BLER function 20 determines a set of target BLERs that provides optimal latency based on the one or more channel conditions (step 308). Then, as discussed above, the adaptive BLER function 20 outputs the set of target BLERs to the outer loop 30 (step 306), where the set of target BLERs is utilized as discussed above with respect to FIG. 3B. In addition, as discussed above, the adaptive BLER function 20 may output a target transmission iteration to the inner loop 28 and/or the outer loop 30. In this embodiment, the set of target BLERs and, if desired, the target transmission iteration for the HARQ-enabled transmission are determined only once for the HARQ-enabled transmission and are not updated during the HARQ-enabled transmission.

Figure 5A:
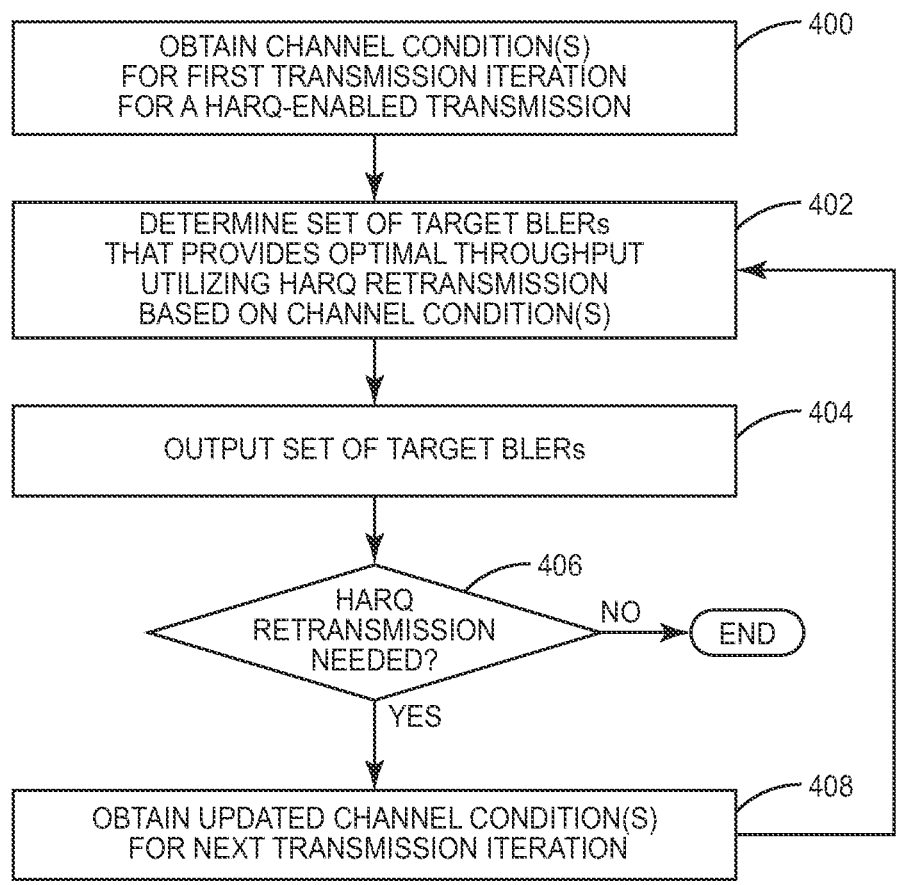
FIGS. 5A and 5B are flow charts that illustrate the operation of the adaptive BLER function and the outer loop link adaptation function, respectively, according to one embodiment of the present disclosure.
Figure 5B:
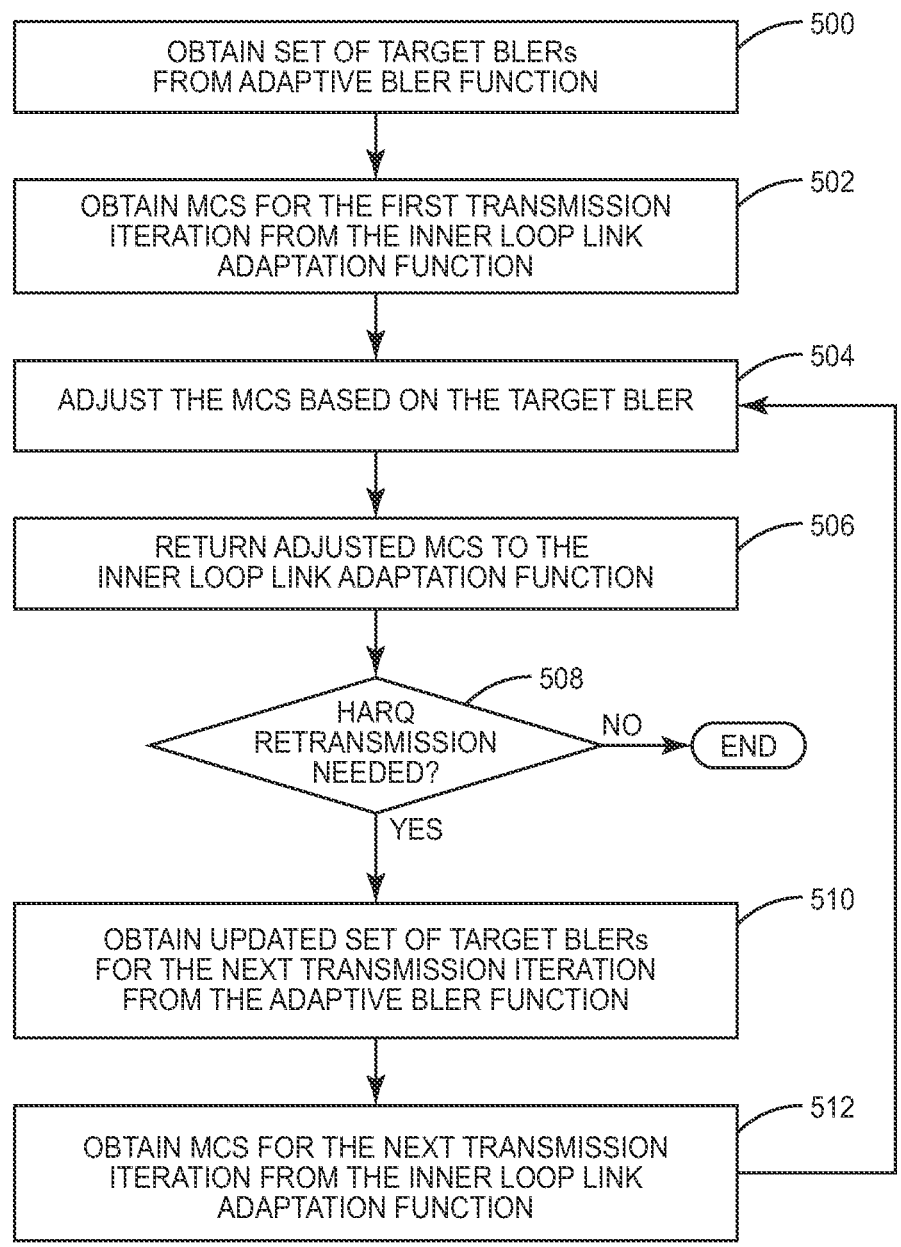

FIGS. 5A and 5B are flow charts illustrating the operation of the adaptive BLER function 20 and the outer loop 30, respectively, to provide improved throughput for a HARQ-enabled transmission according to one embodiment of the present disclosure. As illustrated in FIG. 5A, the adaptive BLER function 20 first obtains one or more channel conditions for a transmit channel for the HARQ-enabled transmission prior to the HARQ-enabled transmission (i.e., prior to a first transmission iteration for the HARQ-enabled transmission) (step 400). Next, the adaptive BLER function 20 determines a set of target BLERs that provides optimal throughput utilizing HARQ retransmission based on the one or more channel conditions (step 402). As discussed above, the optimal throughput may be maximum throughput or an optimization of throughput and one or more additional parameters. The adaptive BLER function 20 then outputs the set of target BLERs to the outer loop 30 (step 404). In addition, as discussed above, the adaptive BLER function 20 may output a target transmission iteration to the inner loop 28 and/or the outer loop 30. Next, a determination is made by the adaptive BLER function 20 as to whether a HARQ retransmission is needed (step 406). A HARQ retransmission is needed when a NACK or similar message is received from the receiver indicating that the receiver did not decode the transmitted block of data successfully. If no HARQ retransmission is needed, the process ends because the HARQ-enabled transmission has completed. However, if a HARQ-enabled retransmission is needed, the adaptive BLER function 20 obtains updated, or new, channel condition(s) prior to the next transmission iteration for the HARQ transmission (step 408). The process then returns to step 402 and is repeated.

As illustrated in FIG. 5B, prior to the first iteration for the HARQ-enabled transmission, the outer loop 30 obtains the set of target BLERs from the adaptive BLER function 20 for the HARQ-enabled transmission (step 500). The outer loop 30 also obtains an MCS selected for the first transmission iteration from the inner loop 28 (step 502). The outer loop 30 adjusts the MCS for the transmission iteration, which at this point is the first transmission iteration, based on the corresponding target BLER from the set of target BLERs (step 504). The outer loop 30 then returns the adjusted MCS to the inner loop 28 (step 506). Next, a determination is made by the outer loop 30 as to whether a HARQ retransmission is needed (step 508). A HARQ retransmission is needed when a NACK or similar message is received from the receiver indicating that the receiver did not decode the transmitted block of data successfully. If no HARQ transmission is needed, the process ends because the HARQ-enabled transmission has completed. However, if a HARQ retransmission is needed, the outer loop 30 obtains an updated, or new, set of target BLERs for the HARQ-enabled transmission from the adaptive BLER function 20 (step 510). As discussed above, the updated, or new, set of target BLERs are determined by the adaptive BLER function 20 prior to the next transmission iteration based on the updated channel condition(s) for the transmit channel. In addition, the outer loop 30 obtains an MCS selected for the next transmission iteration from the inner loop 28 (step 512). The process then returns to step 504 and is repeated.

Figure 6:
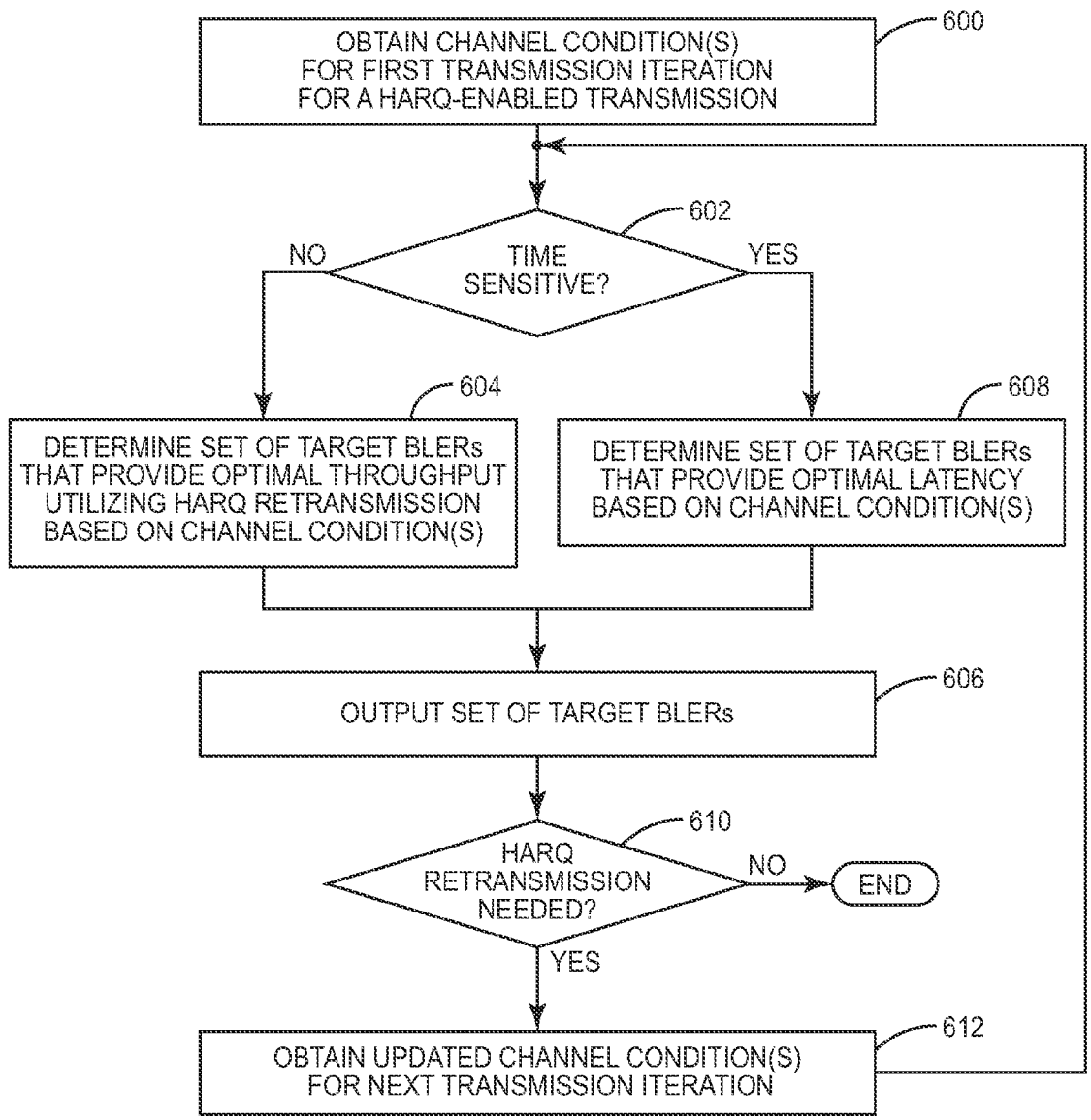
FIG. 6 is a flow chart that illustrates the operation of the adaptive BLER function according to another embodiment of the present disclosure.

FIG. 6 is a flow chart illustrating the operation of the adaptive BLER function 20 according to one alternative embodiment of the present disclosure. As illustrated in FIG. 6, the adaptive BLER function 20 first obtains one or more channel conditions for a transmit channel for the HARQ-enabled transmission prior to the HARQ-enabled transmission (i.e., prior to a first transmission iteration for the HARQ-enabled transmission) (step 600). Next, the adaptive BLER function 20 determines whether the HARQ-enabled transmission is time sensitive (step 602). If the HARQ-enabled transmission is not time sensitive, the adaptive BLER function 20 determines a set of target BLERs that provides optimal throughput utilizing HARQ retransmission based on the one or more channel conditions (step 604). As discussed above, the optimal throughput may be maximum throughput or an optimization of throughput and one or more additional parameters. The adaptive BLER function 20 then outputs the set of target BLERs to the outer loop 30 (step 606), where the set of target BLERs is utilized as discussed above with respect to FIG. 5B. In addition, as discussed above, the adaptive BLER function 20 may output a target transmission iteration to the inner loop 28 and/or the outer loop 30. Returning to step 602, if the HARQ-enabled transmission is time sensitive, the adaptive BLER function 20 determines a set of target BLERs that provide optimal latency based on the one or more channel conditions (step 608). Then, as discussed above, the adaptive BLER function 20 outputs the set of target BLERs to the outer loop 30 (step 606), where the set of target BLERs is utilized as discussed above with respect to FIG. 5B.

Next, a determination is made by the adaptive BLER function 20 as to whether a HARQ retransmission is needed (step 610). A HARQ retransmission is needed when a NACK or similar message is received from the receiver indicating that the receiver did not decode the transmitted block of data successfully. If no HARQ retransmission is needed, the process ends because the HARQ-enabled transmission has completed. However, if a HARQ retransmission is needed, the adaptive BLER function 20 obtains updated, or new, channel condition(s) prior to the next transmission iteration for the HARQ-enabled transmission (step 612). The process then returns to step 602 and is repeated.

Figure 7:
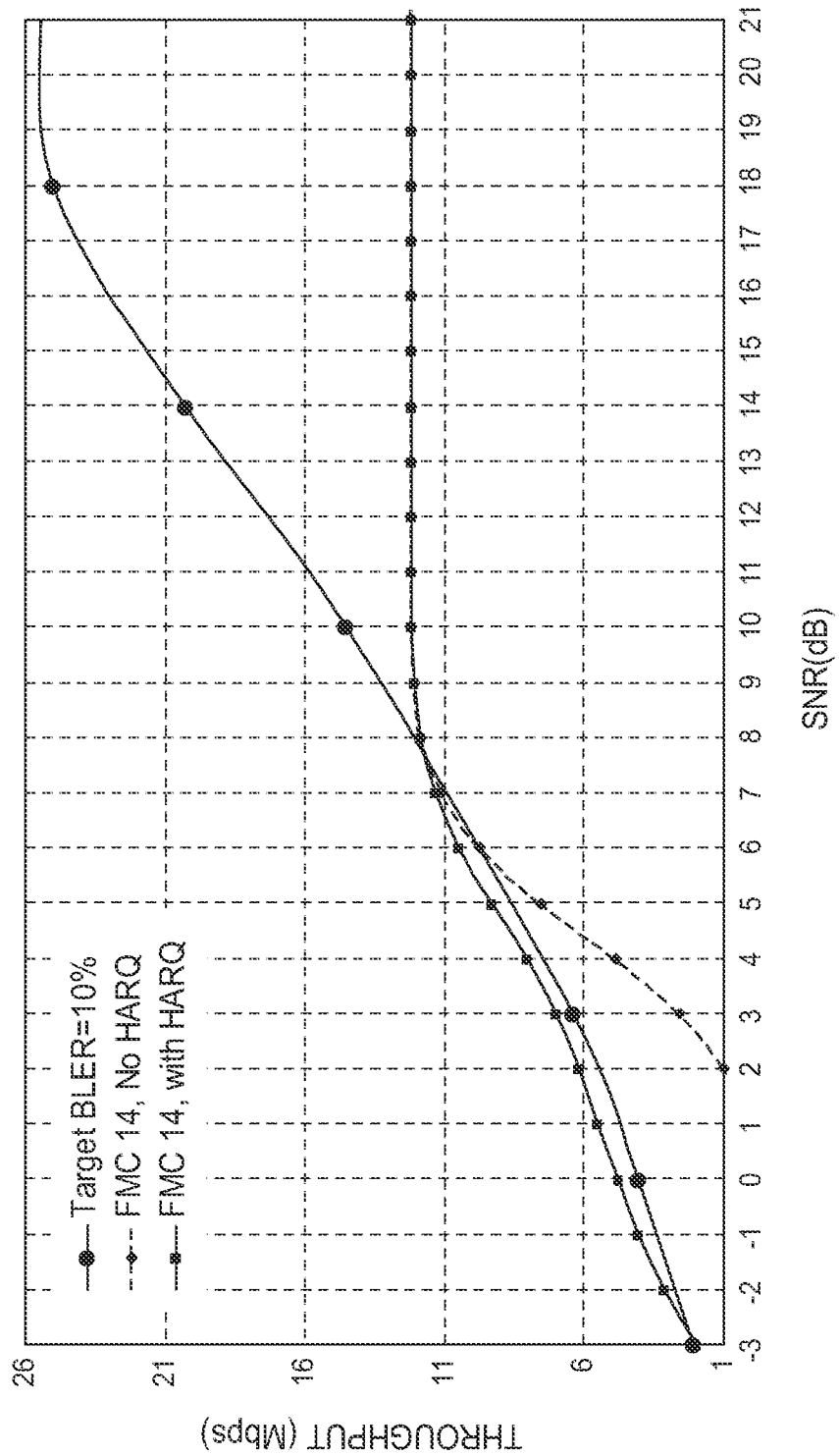
FIG. 7 is a graph of exemplary simulation results that illustrate that always targeting the first transmission iteration does not utilize the full capacity of a Hybrid Automatic Repeat Request (HARQ) feature.
Figure 8:
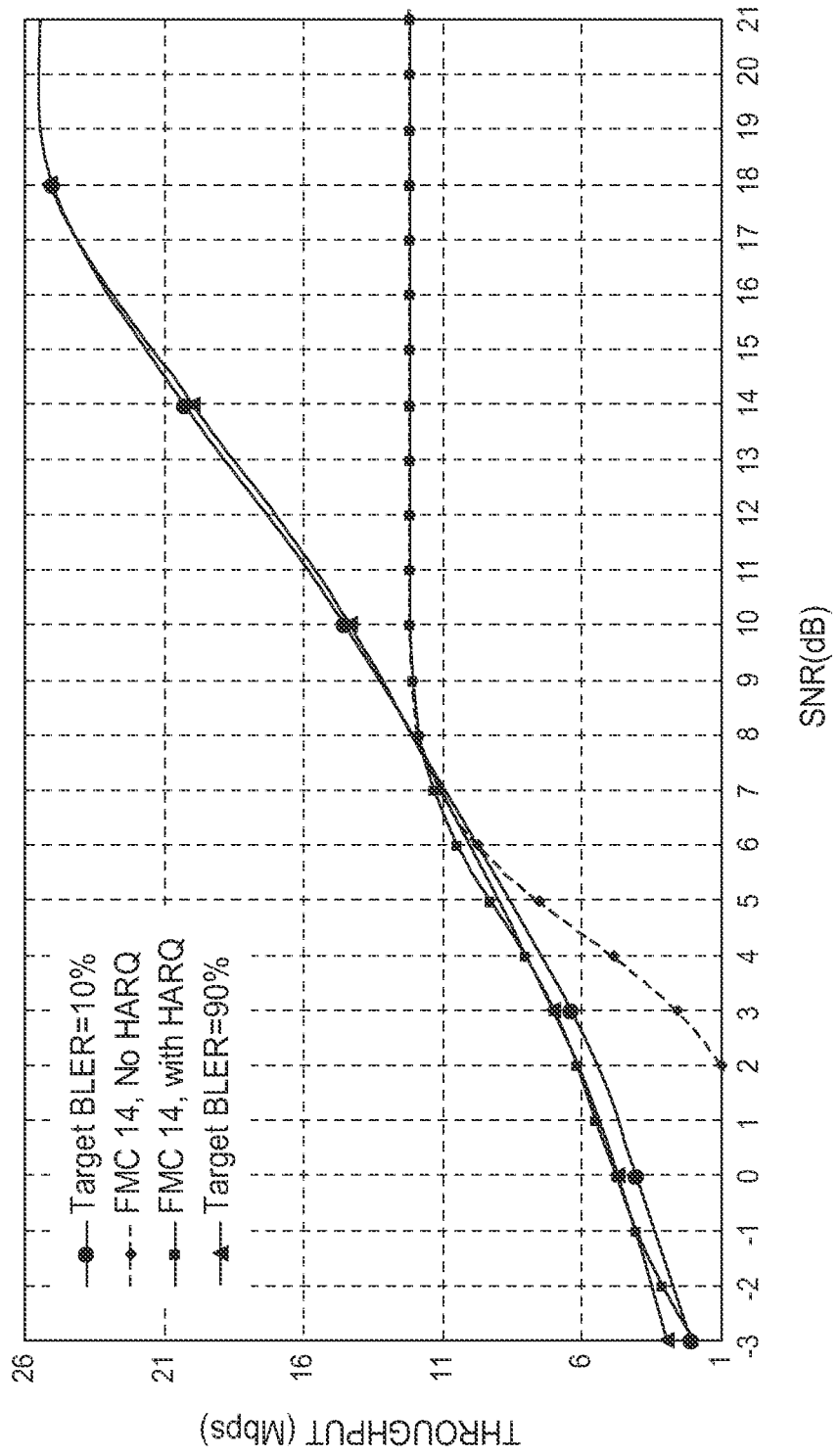
FIG. 8 is a graph of simulation results that illustrate that increasing the target BLER increases throughput for an exemplary transmit channel.
Figure 9:
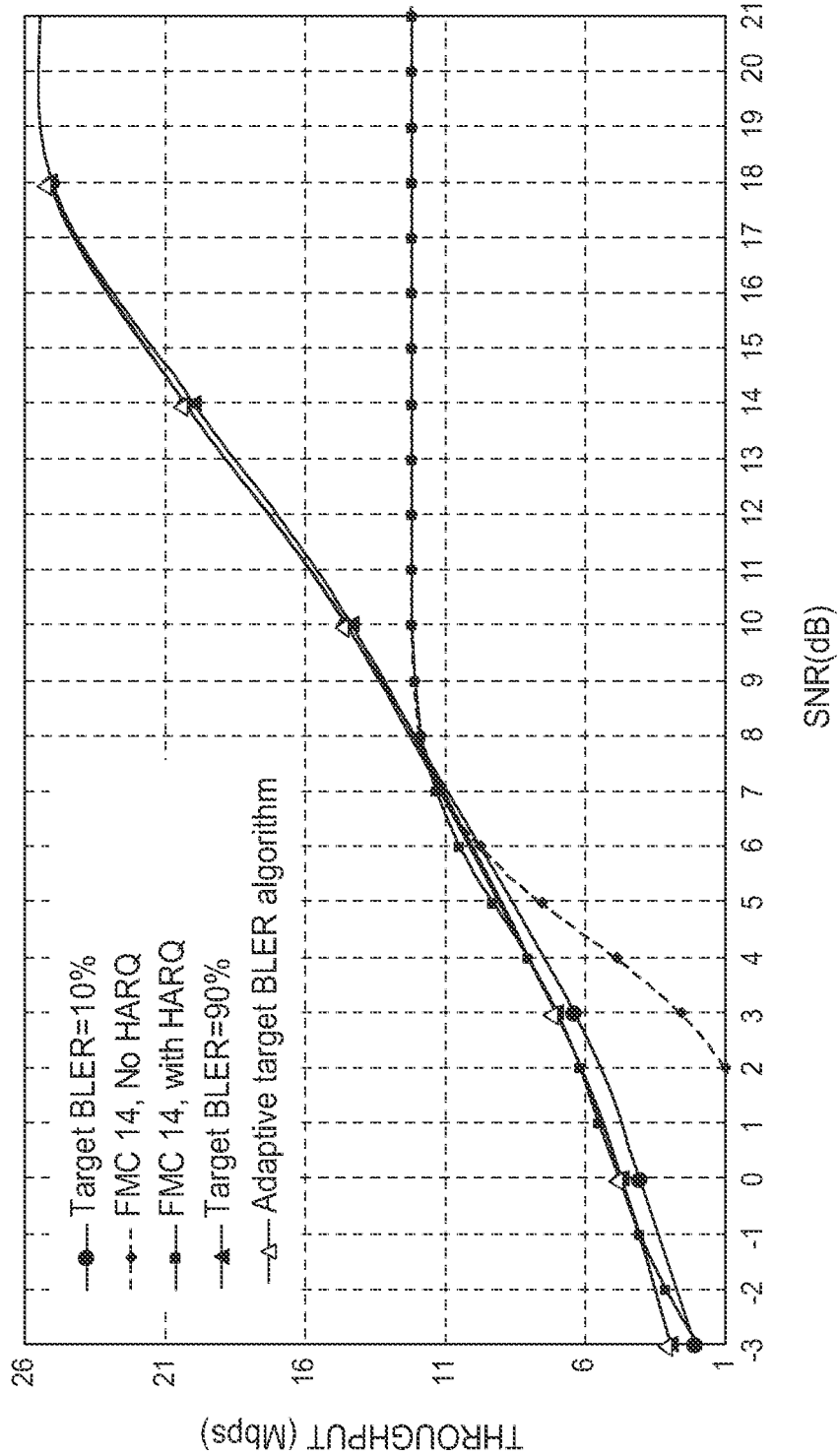
FIG. 9 is a graph of exemplary simulation results comparing throughput for one embodiment of an adaptive target BLER scheme to throughput for a fixed BLER.

FIGS. 7 through 9 graphically depict results of exemplary simulations that illustrate throughput is improved by utilizing HARQ retransmission in the manner described herein. More specifically, FIG. 7 illustrates exemplary simulation results for throughput versus SNR for an exemplary LTE uplink channel (i.e., LTE uplink, Frequency Division Duplexing (FDD), for EVA 70 hertz (Hz), low correlation, 10 megahertz (MHz) bandwidth with 48 RBs for shared channel) for three scenarios, namely: (1) a fixed MCS using a conventional low, static target BLER of 10%, (2) the same fixed MCS without HARQ, and (3) the same fixed MCS with HARQ. These simulation results show that there is room for improving throughput by using HARQ retransmission. In other words, using a static target BLER of 10% does not use the full capacity of the HARQ feature.

FIG. 8 illustrates the same exemplary simulation results from FIG. 7 with the addition of simulation results for a static BLER of 90%. These simulation results show that, if the target BLER is increased to, for example, 90%, the throughput of the curve with link adaptation is increased, particularly for low and moderate SNRs.

FIG. 9 illustrates the same exemplary simulation results from FIG. 8 with the addition of simulation results for an exemplary implementation of an embodiment of the adaptive target BLER process described herein. As illustrated, the adaptive target BLER process results in optimal throughput for all channel conditions.

Figure 10:
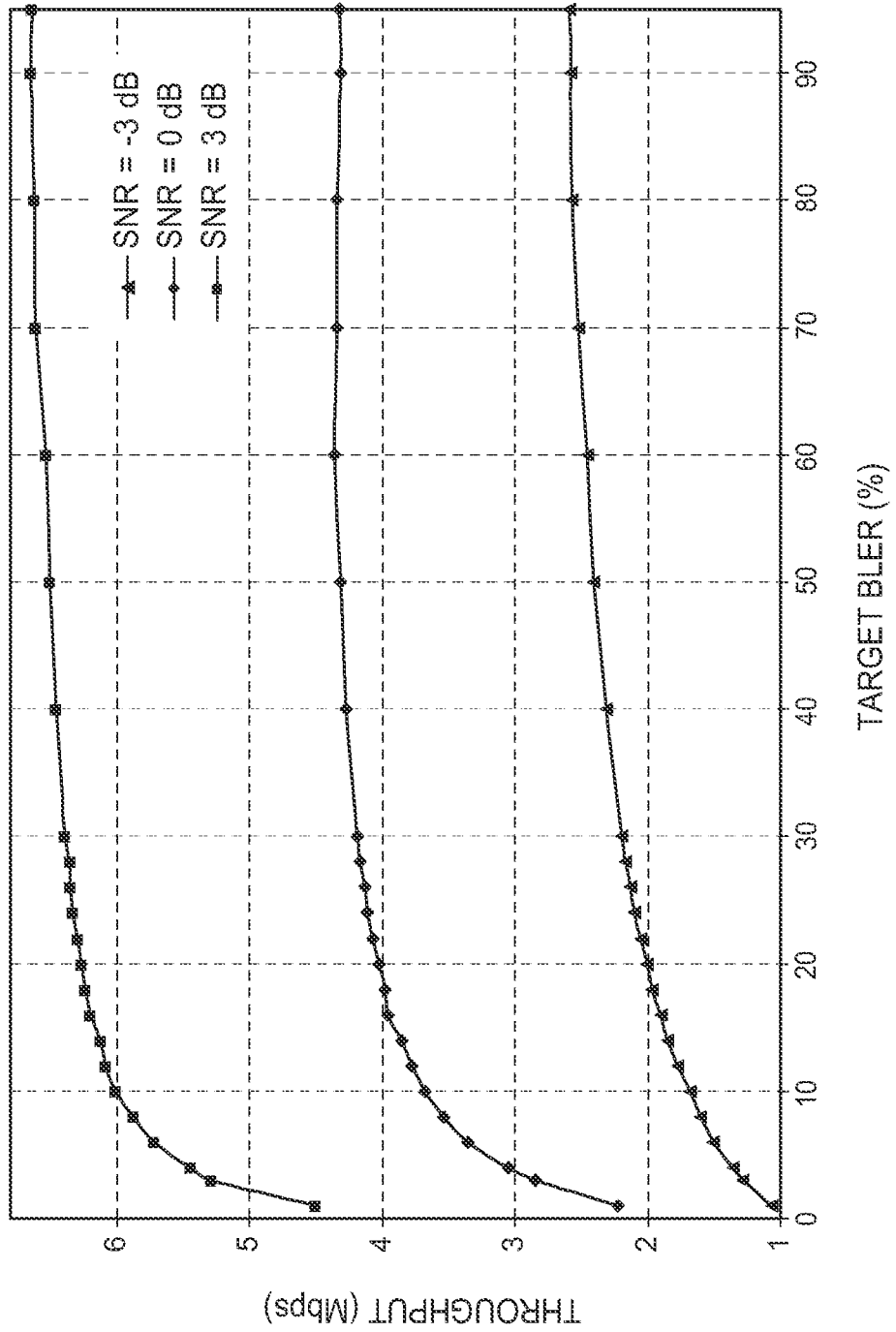
FIG. 10 is a graph of exemplary simulations of throughput versus target BLER for low Signal-to-Noise Ratios (SNRs)
Figure 11:
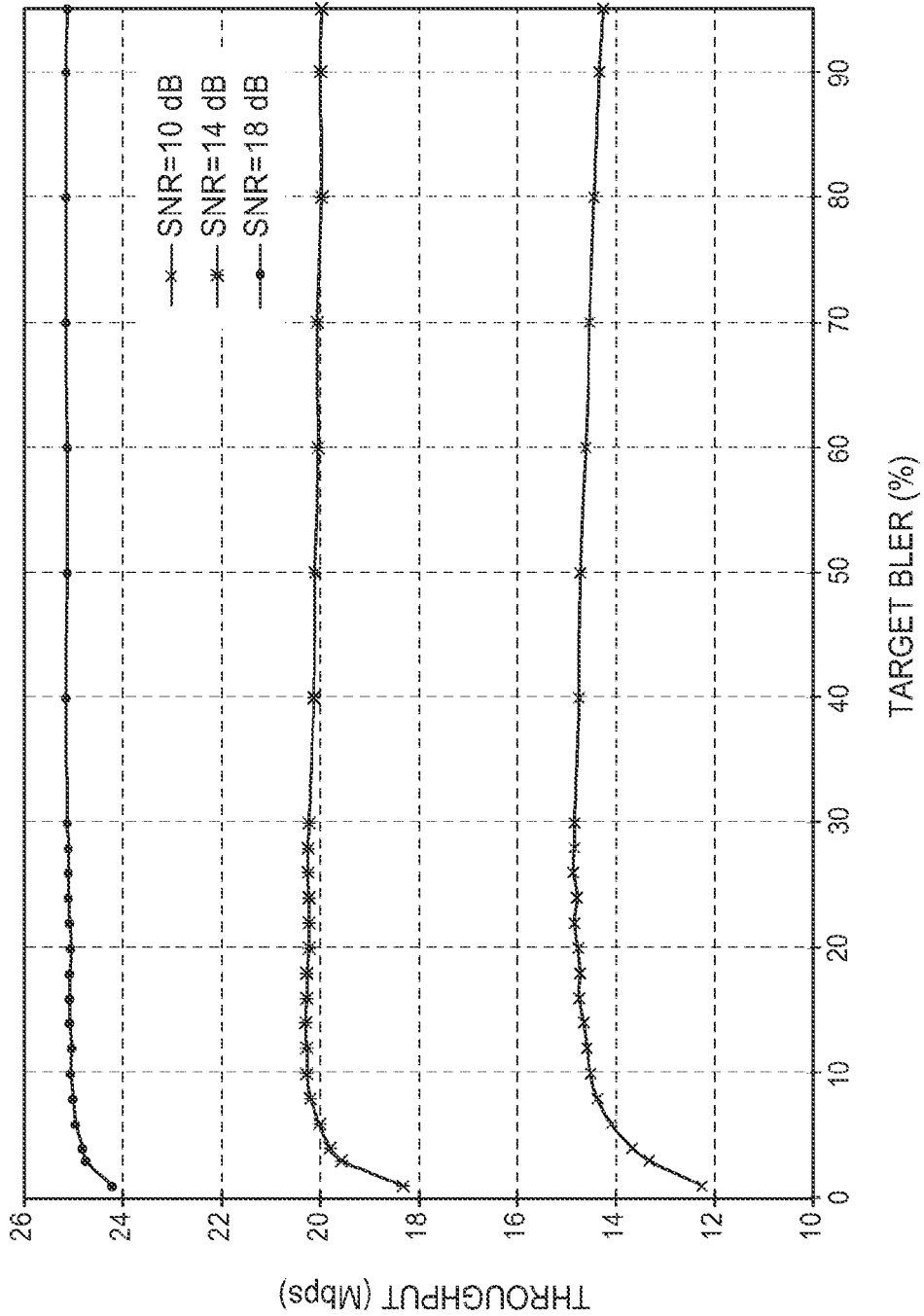
FIG. 11 is a graph of exemplary simulations of throughput versus target BLER for moderate SNRs.

FIGS. 10 and 11 illustrate results of exemplary simulations for throughput versus target BLER for low SNRs (e.g., SNRs encountered for cell-edge mobile stations) and moderate SNRs, respectively. As illustrated, for each SNR value, there is an optimal target BLER that provides the optimal throughput. In this example, the optimal throughput is the maximum throughput. Note, however, that other parameters (e.g., latency) may be taken into consideration in additional to throughput in which case the optimal throughput may be a throughput near but not necessarily equal to the maximum throughput. For example, for an SNR of 0 decibels (dB), while the maximum throughput is achieved for a target BLER of 60%, a target BLER of, for example, 50% or 70% may optimize both throughput and one or more additional parameters. From FIGS. 10 and 11, it can be seen that throughput may be optimized by using high target BLERs for low SNRs and moderate target BLERs for moderate SNRs.

Figure 12:
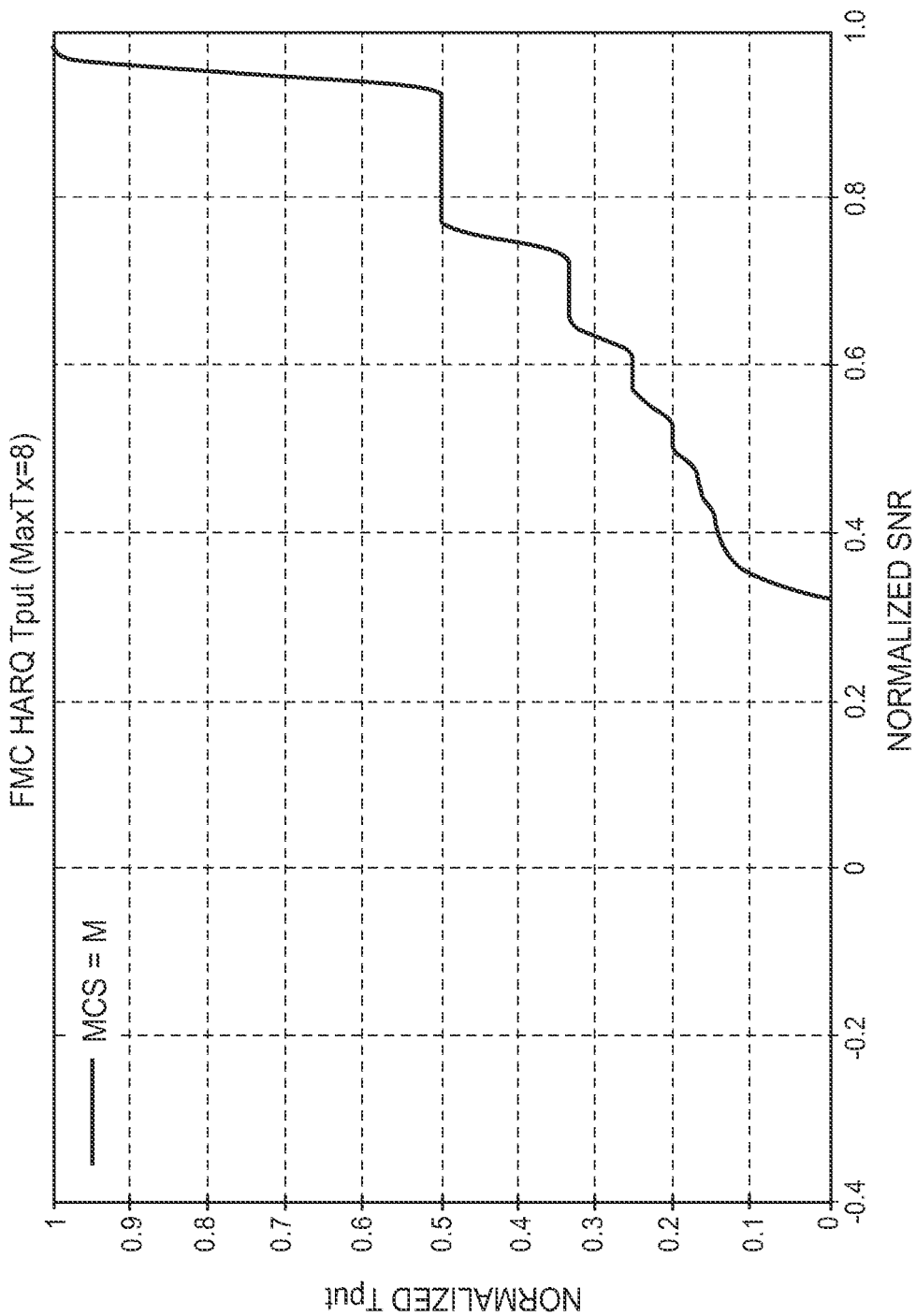
FIG. 12 is a graph of an exemplary simulation of normalized throughput versus normalized SNR for a Fixed Modulation and Coding Scheme (FMC) for HARQ-enabled transmissions.

FIGS. 12 through 15 are exemplary simulation results that illustrate that throughput can be optimized by targeting different transmission iterations based on channel conditions. More specifically, FIG. 12 illustrates normalized throughput versus normalized SNR for a typical FMC curve with fixed MCS=M. In general, at a normalized SNR of 1, a HARQ-enabled transmission is always successfully received on the first transmission iteration, in which case maximum throughput is achieved. In this example, as the normalized SNR decreases from 1 to a value just above 0.9, the HARQ-enabled transmission is sometimes successfully received on the first transmission iteration and sometimes successfully received on the second transmission iteration, in which case throughput begins to decrease. In this example, as the normalized SNR continues to decrease from just above 0.9 to about 0.75, the HARQ-enabled transmission is always successfully received on the second transmission iteration. As the normalized SNR further decreases, the HARQ-enabled transmission is sometimes successfully received on the second transmission iteration and sometimes successfully received on the third transmission iteration. The pattern continues until the normalized SNR reaches a point where the HARQ-enabled transmission is never successfully received in the maximum allowed number of transmission iterations, which in this example is 8.

Figure 13:
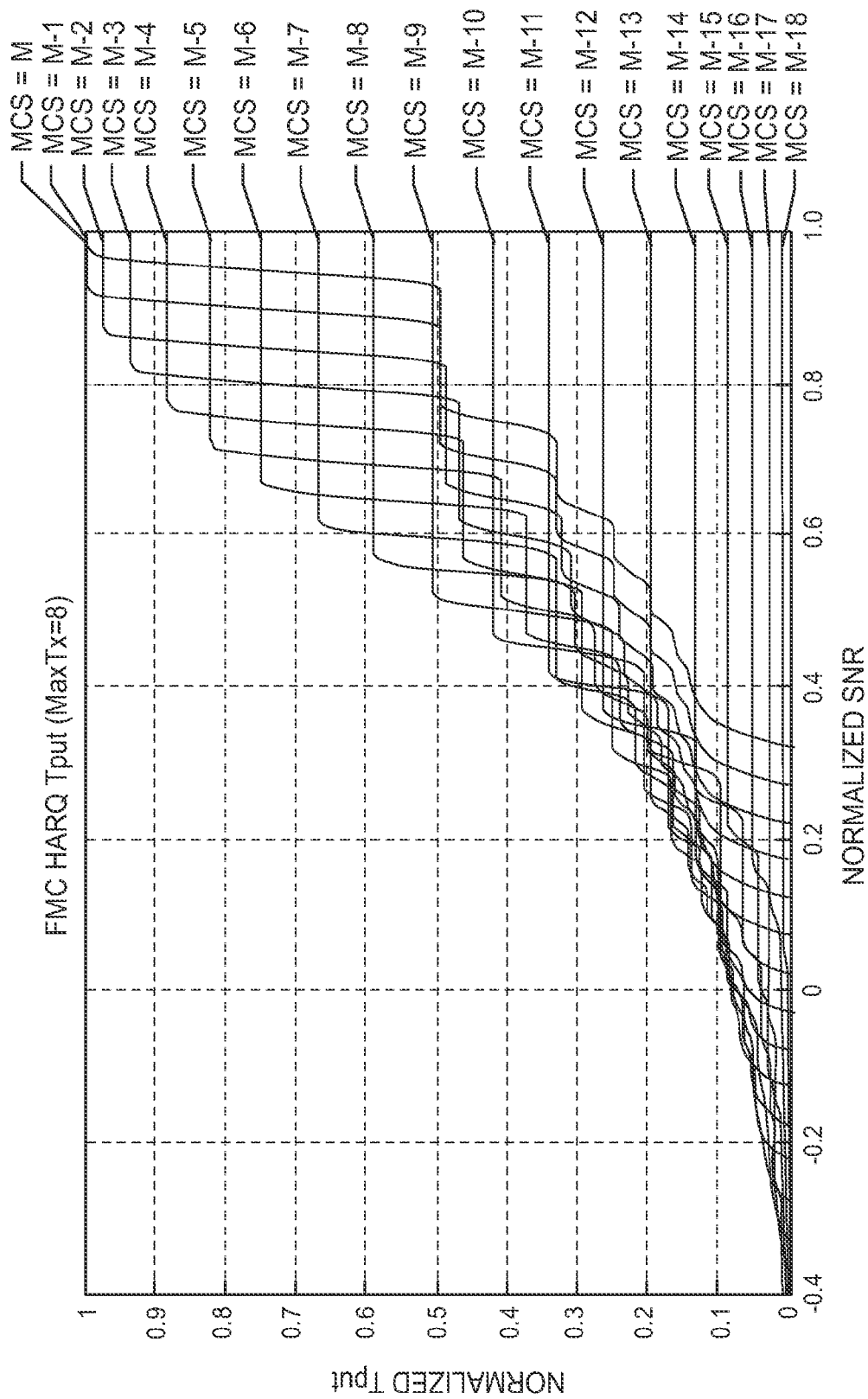
FIG. 13 is a graph of an exemplary simulation of normalized throughput versus normalized SNR for a number of FMCs for HARQ-enabled transmissions.

FIG. 13 illustrates curves similar to that of FIG. 12 but for multiple different MCSs (M, M−1, M−2, etc.), where M is the most aggressive MCS, M−1 is the next most aggressive MCS, etc. As shown, for each normalized SNR value, there is a corresponding MCS that provides optimal throughput.

FIG. 14 illustrates exemplary simulations for throughput versus SNR for link adaptation algorithms, when adaptive MCS is allowed, with fixed HARQ transmission number and BLER termination targets. FIG. 14 shows that for each SNR value, throughput can be optimized by targeting corresponding transmission iteration. For example, in FIG. 14, targeting the second transmission iteration provides optimal throughput for normalized SNR values in the range of about 0.29 to 0.45.

FIG. 15 uses the curves for the fixed HARQ termination numbers from FIG. 14 to illustrate an adaptive target transmission iteration scheme that optimizes throughput. In this example, throughput is optimized by targeting the first transmission iteration for normalized SNRs above about 0.45, targeting the second transmission iteration for normalized SNRs in the range of about 0.29 to 0.45, targeting the third transmission iteration for normalized SNRs in the range of about 0.18 to 0.29, and so on. As discussed above, the adaptive BLER function 20 controls the target BLER to effect target transmission iterations that optimize throughput. FIG. 15 illustrates that adaptively controlling the target transmission iteration improves throughput.

The following acronyms are used throughout this disclosure.

ASIC Application Specific Integrated Circuit
BER Bit Error Rate
BLER Block Error Rate
CC Chase Combining
CDMA Code Division Multiple Access
CQI Channel Quality Indicator
eNB Evolved Node B or base station
EVA Extended Vehicular A model
FDD Frequency Division Duplexing
FMC Fixed MCS
HARQ Hybrid Automatic Repeat Request
HC High Correlation
LA Link Adaptation
LC Low Correlation
TE Long Term Evolution (3GPP 4G technology)
MC Medium Correlation
MCS Modulation and Coding Scheme
NACK Negative Acknowledgement
QoS Quality of Service
RA Rank Adaptation
RB Resource Block
RSSI Received Strength of Signal Indicator
SINR Signal to Interference-Plus-Noise Ratio
SNR Signal-to-Noise Ratio
UE User Equipment
WiMAX Worldwide Interoperability for Microwave Access, Inc. (group promoting IEEE 802.16 wireless broadband standard)

Those skilled in the art will recognize improvements and modifications to the preferred embodiments of the present disclosure. All such improvements and modifications are considered within the scope of the concepts disclosed herein and the claims that follow.

What is claimed is:

1. A method for improving throughput in a wireless system utilizing Hybrid Automatic Repeat Request, HARQ, retransmission, comprising:
    obtaining one or more channel conditions for a transmit channel prior to a HARQ-enabled transmission; and
    determining a set of target block error rates for the HARQ-enabled transmission based on the one or more channel conditions;
    wherein the set of target block error rates includes a separate target block error rate for each transmission iteration for the HARQ-enabled transmission up to at least a target transmission iteration for successful reception of the HARQ-enabled transmission.

2. The method of claim 1 wherein the set of target block error rates provides maximum throughput for the transmit channel for the one or more channel conditions utilizing HARQ retransmission.

3. The method of claim 1 wherein the set of target block error rates optimizes throughput and one or more additional parameters for the transmit channel for the one or more channel conditions utilizing HARQ retransmission.

4. The method of claim 3 wherein the one or more additional parameters comprise latency.

5. The method of claim 1 wherein the target transmission iteration is an N-th transmission iteration for the HARQ-enabled transmission where N is >2.

6. The method of claim 5 wherein the set of target block error rates targets successful reception of the HARQ-enabled transmission on the target transmission iteration.

7. The method of claim 6 wherein the target transmission iteration maximizes throughput for the transmit channel for the one or more channel conditions.

8. The method of claim 6 wherein the target transmission iteration optimizes throughput and one or more additional parameters for the transmit channel for the one or more channel conditions.

9. The method of claim 8 wherein the one or more additional parameters comprise latency.

10. The method of claim 1 wherein a target block error rate from the set of target block error rates for an i-th transmission iteration of the HARQ-enabled transmission is greater than or equal to a target block error rate from the set of target block error rates for an i+1th transmission iteration of the HARQ-enabled transmission.

11. The method of claim 1 further comprising, for each transmission iteration for the HARQ-enabled transmission:
    obtaining a modulation and coding scheme selected for the transmission iteration of the HARQ-enabled transmission; and
    adjusting the modulation and coding scheme for the transmission iteration based on a target block error rate for the transmission iteration included in the set of target block error rates to provide an adjusted modulation and coding scheme for the transmission iteration.

12. The method of claim 11 wherein, for at least one transmission iteration of the HARQ-enabled transmission, adjusting the modulation and coding scheme comprises changing the modulation and coding scheme to a more aggressive modulation and coding scheme.

13. The method of claim 11 wherein the adjusted modulation and coding scheme for an i-th transmission iteration of the HARQ-enabled transmission is at least as aggressive as the adjusted modulation and coding scheme for an i-1th transmission iteration of the HARQ-enabled transmission.

14. The method of claim 1 further comprising:
obtaining a modulation and coding scheme selected for a first transmission iteration for the HARQ-enabled transmission;
adjusting the modulation and coding scheme for the first transmission iteration based on a target block error rate for the first transmission iteration included in the set of target block error rates to provide an adjusted modulation and coding scheme for the first transmission iteration; and
for each additional transmission iteration for the HARQ-enabled transmission:
updating the one or more channel conditions for the transmit channel prior to the additional transmission iteration to provide one or more updated channel conditions;
determining a new set of target block error rates for the HARQ-enabled transmission based on the one or more updated channel conditions;
obtaining a modulation and coding scheme selected for the additional transmission iteration for the HARQ-enabled transmission; and
adjusting the modulation and coding scheme for the additional transmission iteration based on a target block error rate for the transmission iteration included in the new set of target block error rates to provide an adjusted modulation and coding scheme for the additional transmission iteration.

15. The method of claim 1 further comprising updating the set of target block error rates prior to each retransmission for the HARQ-enabled transmission based on the one or more channel conditions.

16. The method of claim 1 further comprising determining a target transmission iteration for successful reception of the HARQ-enabled transmission that maximizes throughput.

17. The method of claim 1 further comprising determining a target transmission iteration for successful reception of the HARQ-enabled transmission that optimizes throughput and one or more additional parameters.

18. The method of claim 17 wherein the one or more additional parameters comprise latency.

19. The method of claim 1 wherein the one or more channel conditions comprise at least one of a group consisting of: Signal-to-Noise Ratio, Signal-Interference-to-Noise Ratio, Received Strength of Signal, Bit Error Rate, a Channel Quality Indicator, and mobile station velocity.

20. The method of claim 1 further comprising:
determining whether the HARQ-enabled transmission is time sensitive;
wherein determining the set of target block error rates comprises:
determining the set of target block error rates for the HARQ-enabled transmission based on the one or more channel conditions such that the set of target block error rates optimizes throughput for the transmit channel for the one or more channel conditions utilizing HARQ retransmission if the HARQ-enabled transmission is not time sensitive; and
determining the set of target block error rates for the HARQ-enabled transmission based on the one or more channel conditions such that the set of target block error rates optimizes latency for the transmit channel for the one or more channel conditions if the HARQ-enabled transmission is not time sensitive.

21. The method of claim 1 wherein the method is a method of operation of a base station in the wireless system.

22. The method of claim 21 wherein the wireless system is one of a group consisting of: a wireless system operating according to the Long Term Evolution standard, a wireless system operating according to the WiMAX standard, or a wireless system operating according to the CDMA EVO standard.

23. A base station in a wireless system that improves throughput utilizing Hybrid Automatic Repeat Request, HARQ, retransmission, comprising:
a transceiver subsystem; and
a processing subsystem associated with the transceiver subsystem and adapted to:
obtain one or more channel conditions for a transmit channel prior to a HARQ-enabled transmission; and
determining a set of target block error rates for the HARQ-enabled transmission based on the one or more channel conditions;
wherein the set of target block error rates includes a separate target block error rate for each transmission iteration for the HARQ-enabled transmission up to at least a target transmission iteration for successful reception of the HARQ-enabled transmission.

24. The base station of claim 23 wherein the transmit channel is an uplink channel from a mobile station to the base station.

25. The base station of claim 23 wherein the transmit channel is a downlink channel from the base station to a mobile station.

26. A method for improving throughput in a wireless system utilizing Hybrid Automatic Repeat Request, HARQ, retransmission, comprising:
controlling a modulation and coding scheme for each transmission iteration of a plurality of transmission iterations for a HARQ-enabled transmission based on a target block error rate; and
separately controlling the target block error rate for each transmission iteration of the plurality of transmission iterations for the HARQ-enabled transmission based on one or more channel conditions for a transmit channel for the HARQ-enabled transmission.

27. The method of claim 26 wherein separately controlling the target block error rate comprises controlling the target block error rate such that throughput for the transmit channel is maximized for the one or more channel conditions utilizing HARQ retransmission.

28. The method of claim 26 wherein separately controlling the target block error rate comprises controlling the target block error rate such that throughput and one or more additional parameters for the transmit channel are optimized for the one or more channel conditions utilizing HARQ retransmission.

29. The method of claim 26 wherein separately controlling the target block error rate for each transmission iteration of the plurality of transmission iterations for the HARQ-enabled transmission based on the one or more channel conditions for the transmit channel for the HARQ-enabled transmission comprises controlling the target block error rate to target an N-th transmission iteration for the HARQ-enabled transmission, where N is >2.

30. The method of claim 26 wherein separately controlling the target block error rate for each transmission iteration of the plurality of transmission iterations for the HARQ-enabled transmission based on the one or more channel conditions for the transmit channel for the HARQ-enabled transmission comprises controlling the target block error rate to target an N-th transmission iteration for the HARQ-enabled transmission that maximizes throughput for the transmit channel for the one or more channel conditions utilizing HARQ retransmission, where N is >2.

31. The method of claim 26 wherein separately controlling the target block error rate for each transmission iteration of the plurality of transmission iterations for the HARQ-enabled transmission based on the one or more channel conditions for the transmit channel for the HARQ-enabled transmission comprises controlling the target block error rate to target an N-th transmission iteration of the HARQ-enabled transmission that optimizes throughput and one or more additional parameters for the transmit channel for the one or more channel conditions utilizing HARQ retransmission, where N is >2.

32. The method of claim 26 wherein separately controlling the modulation and coding scheme comprises controlling the modulation and coding scheme for each transmission iteration for the plurality of transmission iterations of the HARQ-enabled transmission based on the target block error rate such that the modulation and coding scheme for an i-th transmission iteration is at least as aggressive as the modulation and coding scheme for an i-lth transmission iteration.

33. A base station in a wireless system that improves throughput utilizing Hybrid Automatic Repeat Request, HARQ, retransmission, comprising:
 a transceiver subsystem; and
 a processing subsystem associated with the transceiver subsystem and adapted to:
  control a modulation and coding scheme for each transmission iteration of a plurality of transmission iterations of a HARQ-enabled transmission based on a target block error rate; and
  separately control the target block error rate for each transmission iteration of the plurality of transmission iterations for the HARQ-enabled transmission based on one or more channel conditions for a transmit channel for the HARQ-enabled transmission.

34. The base station of claim 33 wherein the transmit channel is an uplink channel from a mobile station to the base station.

35. The base station of claim 33 wherein the transmit channel is a downlink channel from the base station to a mobile station.

* * * * *

UNITED STATES PATENT AND TRADEMARK OFFICE
CERTIFICATE OF CORRECTION

| | |
|---|---|
| PATENT NO. | : 8,914,686 B2 |
| APPLICATION NO. | : 13/208392 |
| DATED | : December 16, 2014 |
| INVENTOR(S) | : Arezou Mohammadi and Edward Mah |

It is certified that error appears in the above-identified patent and that said Letters Patent is hereby corrected as shown below:

On the title page, item (56), References Cited under "OTHER PUBLICATIONS", in Column 2, Line 3 replace:

"model for OFDM sytems" with -- model for OFDM systems --.

In the Specification

In Column 2, Line 8 replace:

"DRAWINGS" with -- DRAWINGS/ --.

In Column 11, Line 61 replace:

"TE" with -- LTE --.

In the Claims

In claim 5, in column 12, at Line 39 replace:

"is >2" with -- is $\geq 2$ --.

In claim 29, in Column 15, at Line 3 replace:

"is >2" with -- is $\geq 2$ --.

Signed and Sealed this
Twenty-sixth Day of May, 2015

Michelle K. Lee
*Director of the United States Patent and Trademark Office*

CERTIFICATE OF CORRECTION (continued)
U.S. Pat. No. 8,914,686 B2

In claim 30, in Column 15, at Line 13 replace:

"is >2" with -- is ≥2 --.

In claim 31, in Column 15, at Line 23 replace:

"is >2" with -- is ≥2 --.

In claim 32, in Column 16, at Line 4 replace:

"for an i-lth transmission iteration" with -- for an i-1th transmission iteration --.